(12) United States Patent
Scrivani (10) Patent No.: US 8,986,761 B2
(45) Date of Patent: Mar. 24, 2015

(54) DISPOSABLE CAPSULE FOR THE PRODUCTION OF AN AROMATIC BEVERAGE, METHOD AND PROCESS MACHINE FOR MAKING IT

(75) Inventor: Massimo Scrivani, Casteggio (IT)

(73) Assignee: Azionaria Construzioni Macchine Automatiche A.C.M.A. S.p.A. (IT)

( * ) Notice: Subject to any disclaimer, the term of this patent is extended or adjusted under 35 U.S.C. 154(b) by 406 days.

(21) Appl. No.: 12/881,709

(22) Filed: Sep. 14, 2010

(65) Prior Publication Data

US 2011/0250319 A1    Oct. 13, 2011

(30) Foreign Application Priority Data

Apr. 7, 2010   (IT) .............................. MI2010A0584

(51) Int. Cl.
*B65B 29/02*        (2006.01)
*B65D 85/804*       (2006.01)

(52) U.S. Cl.
CPC .................................. *B65D 85/8043* (2013.01)
USPC .................. 426/77; 99/295; 99/323; 426/115

(58) Field of Classification Search
CPC .................. B65D 85/8043; B65D 2581/3409; B65D 25/00; B65D 85/8046; B65D 85/812; B65D 77/2016; A47J 31/08
USPC ................ 426/77–81, 115, 394; 99/295, 323; D9/429
See application file for complete search history.

(56) References Cited

U.S. PATENT DOCUMENTS

| | | | | |
|---|---|---|---|---|
| 4,136,202 | A * | 1/1979 | Favre | 426/77 |
| 4,886,674 | A * | 12/1989 | Seward et al. | 426/79 |
| 4,983,410 | A * | 1/1991 | Dinos | 426/77 |
| 5,008,013 | A * | 4/1991 | Favre et al. | 210/482 |
| 5,043,172 | A * | 8/1991 | Loizzi | 426/77 |
| 5,242,702 | A * | 9/1993 | Fond | 426/433 |
| 5,472,719 | A * | 12/1995 | Favre | 426/77 |
| 5,489,453 | A * | 2/1996 | Friesch | 428/34.1 |
| 6,189,438 | B1 * | 2/2001 | Bielfeldt et al. | 99/321 |
| 7,594,470 | B2 * | 9/2009 | Scarchilli et al. | 99/295 |
| 2003/0172813 | A1 * | 9/2003 | Schifferle | 99/275 |
| 2005/0150390 | A1 * | 7/2005 | Schifferle | 99/295 |
| 2006/0027493 | A1 * | 2/2006 | France et al. | 210/493.1 |

FOREIGN PATENT DOCUMENTS

| | | |
|---|---|---|
| EP | 2159167 | 3/2010 |
| WO | 2009110783 | 9/2009 |

OTHER PUBLICATIONS

Italian Search Report for application No. IT MI20100584, dated Oct. 12, 2010.

* cited by examiner

*Primary Examiner* — Drew Becker
*Assistant Examiner* — Luana Z Long
(74) *Attorney, Agent, or Firm* — Timothy J. Klima; Shuttleworth & Ingersoll, PLC (57) ABSTRACT

The disposable capsule for the production of an aromatic beverage comprises a container having a closed base which can be perforated for the inlet of water, and an open base closed by at least a filter through which the beverage can exit, said filter having a peripheral edge applied to a peripheral profile of said open base of the container, the peripheral profile of the open base to which the peripheral edge of said filter conforms having a peripheral development at a variable height with respect to the axis of the container.

13 Claims, 7 Drawing Sheets

DISPOSABLE CAPSULE FOR THE PRODUCTION OF AN AROMATIC BEVERAGE, METHOD AND PROCESS MACHINE FOR MAKING IT

FIELD OF INVENTION

The present invention refers to a disposable capsule for the production of an aromatic beverage, particularly but not exclusively of American coffee, and to a method and a process machine for its realization.

BACKGROUND

Disposable capsules are known since time of the type comprising a container having an plane openable or punchable base for the introduction of water and a closed plane base from a plane filter, protected by a peelable film before use, through which the beverage produced by infusion of water with the aromatic substance present in the container is delivered.

It is known that such capsules, due to their conformation, can negatively affect the correct execution of the infusion, with a consequent penalization of the organoleptic characteristics of the produced beverage.

This is often due to the characteristics of the filter, having a surface extension sometimes insufficient, being substantially equal to that of the plane base of the container to which it is applied.

With particular reference to capsules for American coffee, which require an extraction procedure of the aroma purely by percolation, the filter, if having an insufficient surface, tends to obstruct and form a non desired overpressure inside the container. The provision of a greater filtering surface in a known disposable capsule would require a more bulky container in a transversal direction, which in turn would require specifically dimensioning also the infusion chamber in which the capsule is housed.

SUMMARY

Technical task of the present invention is therefore to realize a disposable capsule for the production of an aromatic beverage, a method and a process machine for its realization, which permit to eliminate the technical drawbacks lamented in the known art.

Within this technical task, an aim of the invention is to realize a disposable capsule for the production of an aromatic beverage, having an optimized filtering capacity.

Another aim of the invention is to realize a disposable capsule for the production of an aromatic beverage being compact and structurally simple.

A further aim of the invention is to realize a disposable capsule for the production of American coffee which optimizes the efficiency of the percolation process.

The technical task, and also these and other aims according to the present invention, are reached by realizing a disposable capsule for the production of an aromatic beverage of the type comprising a container having a punchable closed base for the inlet of water, and an open base closed by at least a filter through which the beverage is able to exit, said filter having a peripheral edge applied to a peripheral profile of said open base of the container, said peripheral profile of said open base to which said peripheral edge of said filter conforms has a peripheral development at a variable height with respect to the axis of said container.

In a first preferred embodiment of the invention, the peripheral profile of said open base of the container, having a variable height with respect to the axis of said container, has at least partially an undulatory development.

In a second preferred embodiment of the invention, the peripheral profile of said open base of the container, having a variable height with respect to the axis of the container, has at least partially a curvilinear development.

Preferably, the filter is externally covered with a peelable protective film.

Preferably, the punchable closed base has one or more shapes permitting its identification.

Furthermore the punchable closed base has a number of perforation sites for the inlet of the water, variable in function of the feeding pressure requested for the water.

Preferably, the perforation sites of the punchable closed base are flush with one or more shapes.

In the method for the realization of a disposable capsule, the filter, before its application in the container has an initial high space-demanding configuration, and after the application in the container has a lower space-demanding configuration obtained during the step of application in the container in which the peripheral edge of said filter is pressed against the peripheral profile of said open base of the container in order to be deformed until conforming itself to it.

Preferably in said initial configuration said filter is stretched.

In the method preferably initially the filter is positioned on the open base of the container and thereafter a plurality of sectors, from which a shaper is formed, are actuated in a time sequence against the peripheral profile of the open base of the container, said shaper wholly reproducing a shape conjugated to which of the peripheral profile of the open base of the container.

In a possible way for realizing the invention, each of said sectors is moveable in order to actuate and contrast a corresponding elastic element.

Advantageously, the shaping of the filter from its great space-demanding configuration to its lower space-demanding configuration is directly realized in a process machine able to produce said disposable capsule.

The process machine for the production of a disposable capsule comprises a shaper made by a plurality of sectors which wholly reproduce a form conjugated to that of the peripheral profile of the open base of the container, a conveyor having a series of pitch-separated seats each destined to house at least a corresponding container for the application of a corresponding filter, said conveyor being actuatable in order to sequentially align said seats to the shaper with said at least one container present in each of them, placed with the open base facing the shaper, and an applicator able to interpose the filter between the shaper and the open base of the container facing the same before the actuation of the shaper.

In the process machine, preferably said applicator comprises pliers for the unwinding of a coiled band from which said filter is made, and a tool for custom-cutting from the coiled band a strip forming the filter.

In the process machine, preferably said seats are shaped in order to orientate said containers with a vertical axis and with said open base facing upwards, and said sectors of said shaper are oriented with a vertical axis in the direction of which they are moveable.

Other features of the present invention are further defined in the subsequent claims.

BRIEF DESCRIPTION OF THE DRAWINGS

Further features and advantages of the invention will be clearer from the description of some preferred but non exclusive embodiments of the disposable capsule and of the equipment for its realization according to the finding, shown in an indicative and non limitative way in the annexed drawings, in which.

DETAILED DESCRIPTION OF THE PREFERRED EMBODIMENTS

Initial reference is made to the first preferred embodiment of the invention, shown in FIGS. 1-6d.

The disposable capsule 1 for the production of an aromatic beverage, particularly but not exclusively for an American coffee, comprises a quadrangular container 2 having a closed base 3 provided with two breakable formations 4, 5 for the inlet of water of infusion into the container 2.

Figures 2, 3, 4:
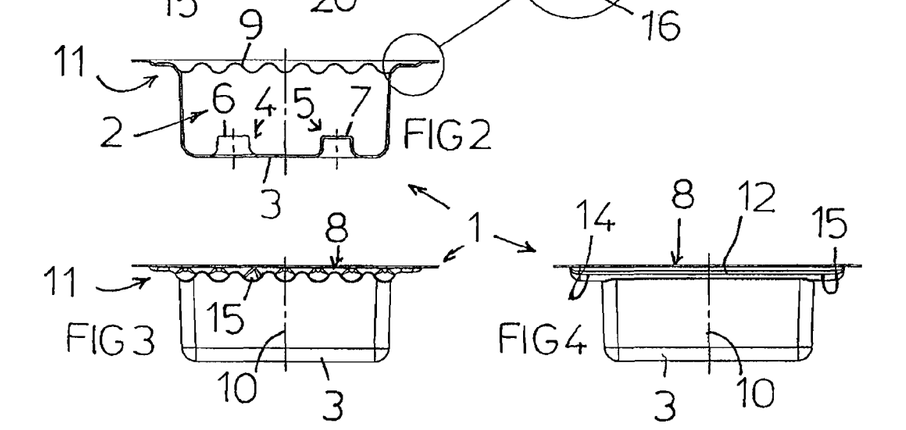
FIG. 2 shows a side elevation view of the capsule in FIG. 1 cut along the line 2-2.
FIG. 3 shows a side view of the capsule in FIG. 1.
FIG. 4 shows a front view of the capsule in FIG. 1.
Figure 5:
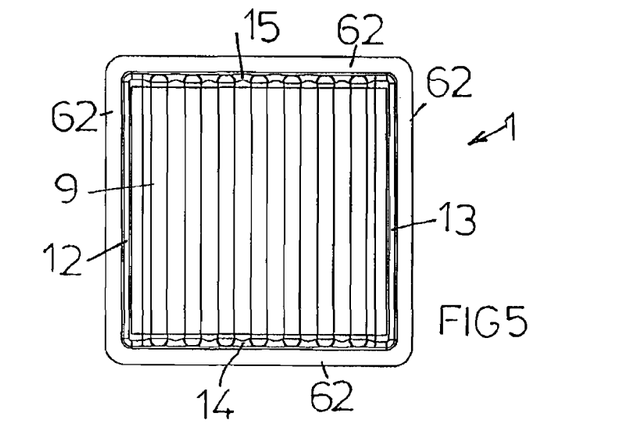
FIG. 5 shows a top view of the capsule in FIG. 1.

The formations 4, 5 each comprise a tube protruding inside the container 2 and able to receive a perforating needle through which the water of infusion supplied inside the container 2 can flow.

The formations 4, 5 are aligned along a diagonal of the base 3 such as to form also a specific identification key of the capsule 1, due to the fact that only capsules with such a disposition of the formations 4, 5 can correctly engage the hollow perforating needles provided in a suitable position in the infusion chamber 3 of the infuser of the machine for the preparation of an aromatic beverage.

The punchable formations 4, 5 are in an exemplary way in a number of two, particularly suitable in the case in which a supply pump of the infuser working at high pressure is provided, but in case of a supply pump working at low pressure, also just one of the punchable formations 4, 5 can be provided.

Figure 1:
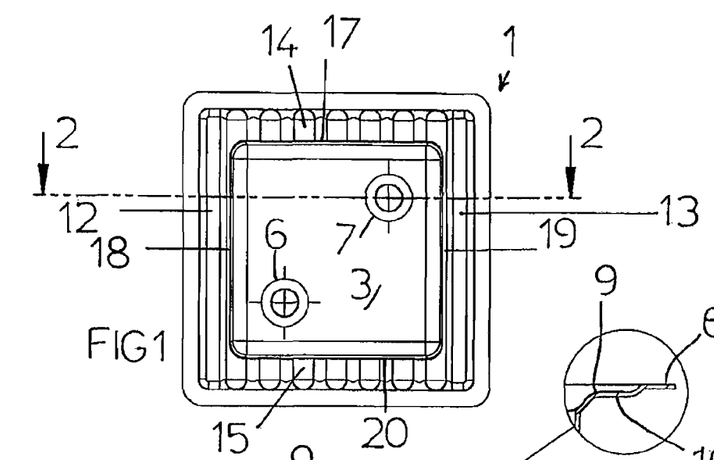
FIG. 1 shows a bottom view of a disposable capsule according to a first preferred embodiment of the invention.

The container 2 has also an open base 8, closed by a filter 9, able to filter the contents of the container 2.

The peripheral edge of the filter 9 is particularly applied to a peripheral profile 11 of the open base 8 of the container 2.

The peripheral profile 11 of the open base 8 comprises a flaring towards the outside of the end of the side walls 17, 18, 19, 20 of the container 2 opposed to that delimiting the punchable closed base 3.

The peripheral profile 11 of the open base 8 to which the peripheral edge of the filter 9 conforms, has a peripheral development at a variable height with respect to the axis 10 of the container 2, and particularly it develops peripherally with an at least partially undulatory progression.

The axis of the container 2 is that orthogonal to the support plane of the punchable closed base 3.

More precisely, of the four sides of the peripheral profile 11 of the base 8, two alternate sides 12, 13 are rectilinear, whereas two alternate sides 14, 15 describe a sinusoid.

The filter 9 is covered by a protective film (not shown), removably applied to an outer peripheral lip 62 of the peripheral profile 11 of the base 8.

The film having the function of preserving the hygiene of the filter 9 is removed before using the capsule 1.

The process machine for the production of a capsule 1 comprises a shaper 21, made by a plurality of sectors 22, which together reproduce a form conjugated to that of the peripheral profile 11 of the base 8 of the container 2.

As the sectors 22 are concerned, two outer sectors 22 are destined to couple one to the rectilinear side 12, and the other to the rectilinear side 13 of the peripheral profile 11 of the base 8, whereas each inner sector 22 is destined to couple simultaneously with its shaped end, in a pair of opposite depressions of the two sinusoidal sides 14, 15 of the peripheral profile 11 of the base 8.

So many inner sectors 22 are provided, as the pairs of opposite depressions of the two sinusoidal sides 14, 15.

The sectors 22 are supported, with a possible independent movement, by a common plate 23 which can be actuated in translation by a crank assembly 63.

Each sector 22 is associated to the plate 23 by means of a corresponding elastic element 24, particularly but not necessarily a coil spring, in order to be movable in translation, the same direction of translation of the plate 23, acting and in contrast with the corresponding elastic element 24, independently from the other sectors 22.

The length at rest of the elastic elements 24 is such, that the sectors 22, proceeding from a sector 22 external to the other one, have the shaped end at a progressively decreasing distance from the plate 23.

The process machine also provides a conveyor 25 having a series of pitch-separated seats 26, and each destined to house a corresponding container 2 for the application of a corresponding filter 9.

The conveyor 25 can be in case pitch-actuated also in other ways, for example continuously, in order to align in sequence the containers 2 under the shaper 21 with the base 8 closed by the filter 9 and facing the shaper 21.

An applicator 27 is able to interpose the filter 9 between the base 8 of the container 2 and the shaper 21 before actuating this latter.

The applicator 27 comprises pliers 28 for unwinding a coiled band 30, from which the filter 9 is made, and a tool 29 for custom cutting the filter 9 from the coiled band 30. The seats 26 are formed in order to house the containers 2 with a vertical axis 10 and with the base 8 facing upwards.

Also the sectors 22 of the shaper 21 are oriented with a vertical axis in the direction of which they are movable.

In the embodiment of the capsule 1, the filter 9 advantageously has, before the application to the container 2, an initial high-encumbrance configuration, particularly stretched, and after the application to the container 2 has a reduced encumbrance configuration, in any case with the same useful filtering surface, obtained during the application phase to the container 2, in which the peripheral edge of the filter 9 is pressed against the peripheral profile 11 of the base 8 of the container 2 in order to deform itself until conforming with the same.

Advantageously, the modelling of the filter 9 from its high-encumbrance configuration to its reduced encumbrance configuration is directly realized in the process machine.

Figure 6A:
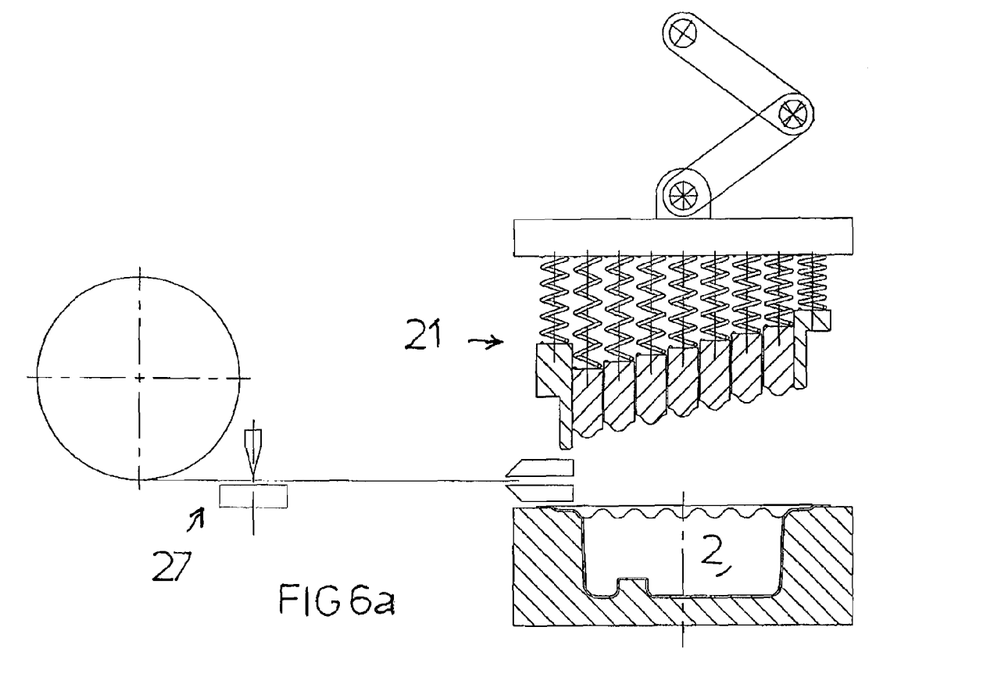
FIGS. 6a-6d show the timing sequence of the application phase of the filter to the container in the process machine for the production of the capsule in FIG. 1.

Initially, the pliers 28 pull the shaped band 30 by unwinding a portion which is positioned on the base 8 of the container 2, where the tool 29 cuts a rectangular strip forming the filter 9.

The filter 9, initially in a stretched configuration, rests on the base 8 of the container 2.

Figure 6B:
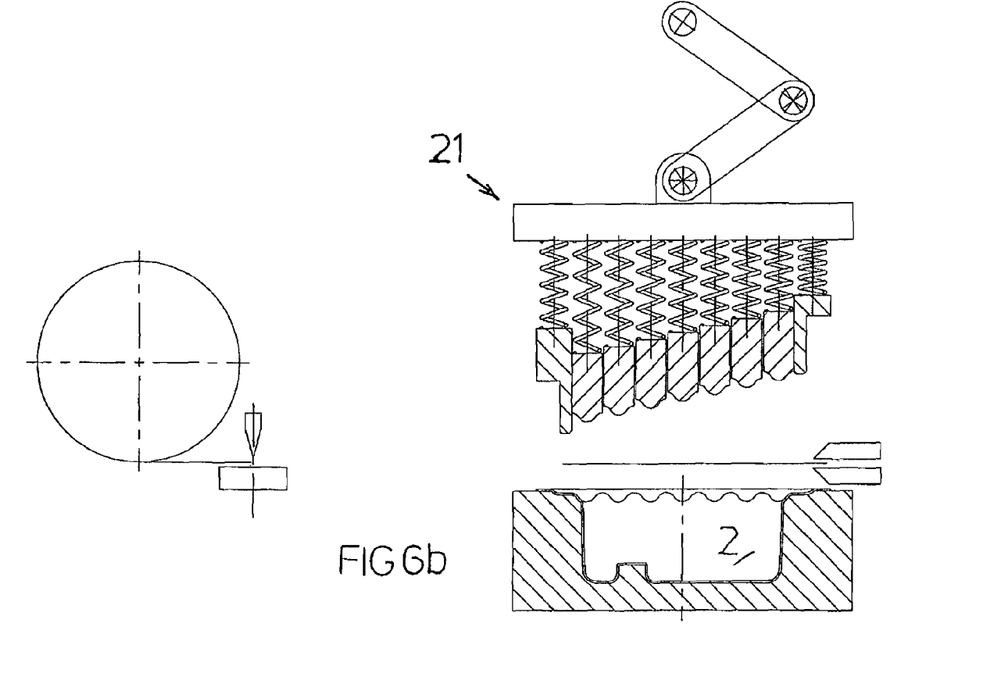
Figure 6C:
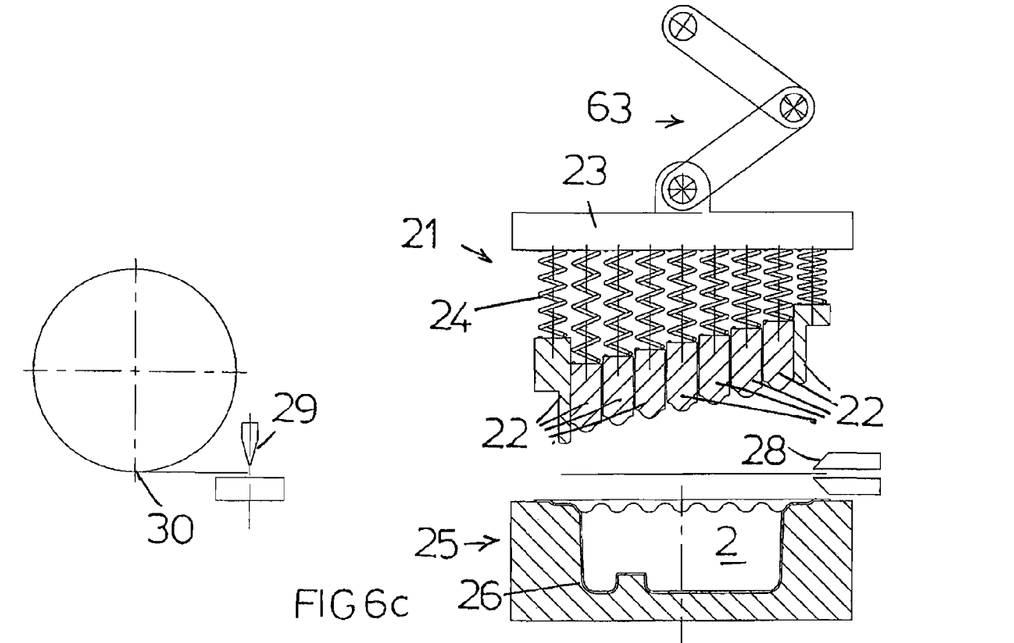
Figure 6D:
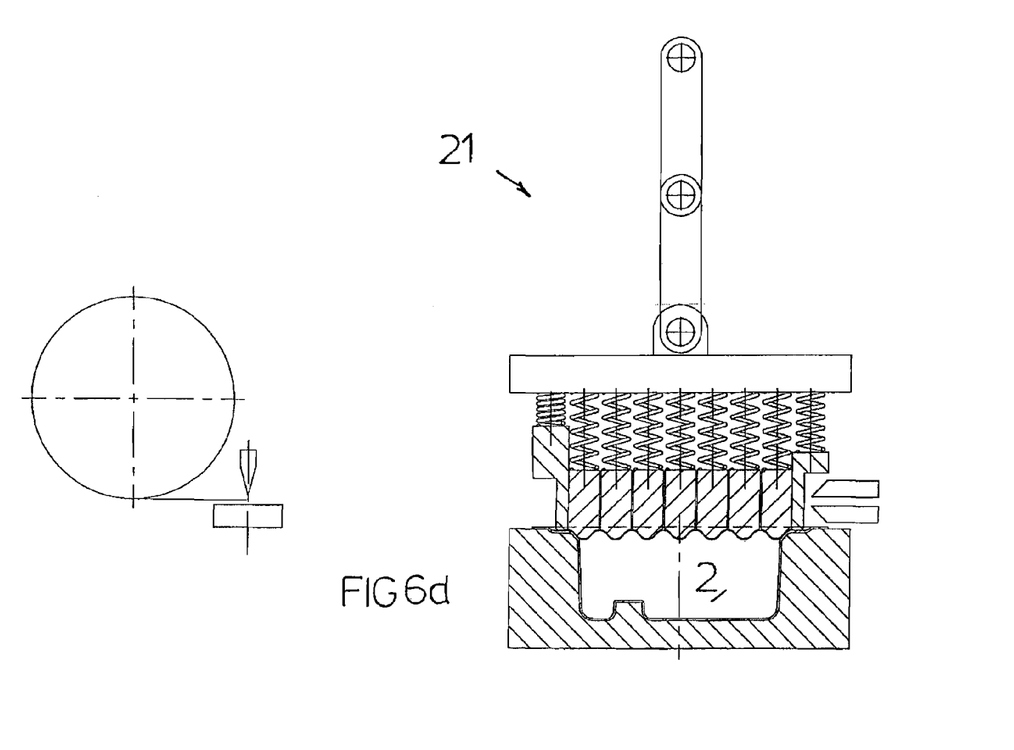

The sectors are so actuated in a timing sequence against the base 8 of the container 2.

The peripheral profile 11 of the base 8 substantially acts as an opposite die for the shaper 21.

Particularly, when the plate 23 is vertically translated downwards, the lower external sector 22 firstly contacts a rectilinear side of the peripheral profile 11 of the base 8, by applying to the same a short side of the filter 9.

The following sector 22 contacts in a subsequent moment the first pair of opposite depressions of the sinusoidal sides of the peripheral profile 11 of the base 8, by applying and conforming to them a portion of the filter 9, and so on, until the last higher external sector, which as the last contacts the other rectilinear side of the peripheral profile 11 of the base 8, applies to it the other short side of the filter 9, ending the application of the filter 9 to the base 8.

The shaped ends of the sectors 22 are heated in order to peripherally weld the filter 9 to the peripheral profile 11 of the base 8 of the container 2.

Reference will now be made to the second preferred embodiment of the invention, shown in FIGS. 7-12a.

Figure 7:
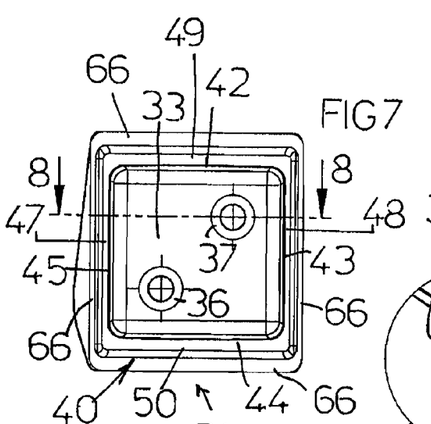
FIG. 7 shows a bottom view of a disposable capsule according to a second preferred embodiment of the invention.
Figure 8:
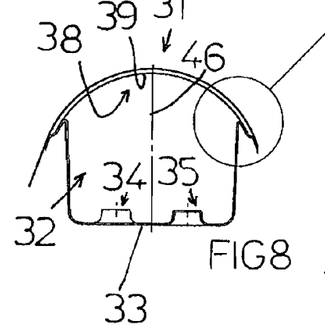
FIG. 8 shows a side elevation view of the capsule in FIG. 7 cut along the line 8-8.
Figure 11:
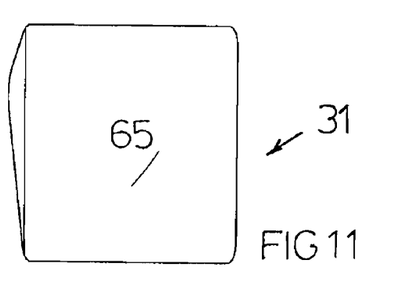
FIG. 11 shows a top view of the capsule in FIG. 7.

The disposable capsule 31 comprises a quadrangular container 32 having a closed base 33 provided with two breakable formations 34, 35 for the inlet of the water of infusion into the container 2.

Each formation 34, 35 comprises a tube 36, 37 protruding towards the interior of the container 32 and able to receive an hollow perforating needle through which the water of infusion supplied to the interior of the container 32 can flow.

The formations 34, 35 are aligned along a diagonal of the base 33 in order to also form a specific identification key of the capsule 31, as only capsules with such an arrangement of the formations 34, 35 can correctly engage with the hollow perforating needles provided in a suitable position in the infusion chamber of the infuser of the machine for the preparation of the aromatic beverage.

The container 32 also has an open base 38 closed by a filter 39.

The peripheral edge of the filter 39 is particularly applied to a peripheral profile 40 of the open base 38 of the container 32.

Figure 9:
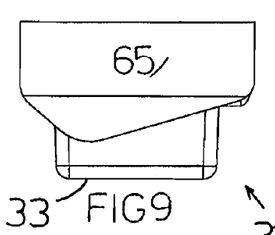
FIG. 9 shows a side view of the capsule in FIG. 7.
Figure 10:
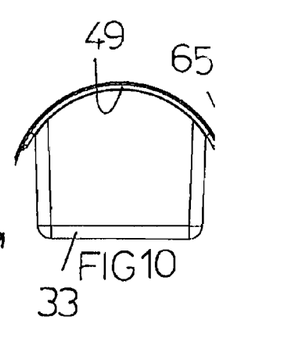
FIG. 10 shows a front view of the capsule in FIG. 7.

The peripheral profile 40 of the base 38 comprises a flaring 41 towards outside of the end of the side walls 42, 43, 44, 45 of the container 32 opposed to that delimiting the punchable base 33.

The peripheral profile 40 of the open base 38 to which the peripheral edge of the filter 39 conforms, has a peripheral development at a variable height with respect to the axis 46 of the container 32 and particularly develops peripherally in an at least partially curvilinear way.

The axis 46 of the container 32 is orthogonal to the rest plane of the punchable closed base 33.

More precisely, of the four sides of the peripheral profile 40 of the base 38, two alternate sides 47, 48 are rectilinear, whereas the other two alternate sides 49, 50 describe a parabola with concavity facing the side walls of the container 32.

The filter 39 is covered by a protective removable film 65 applied to an outer peripheral lip 66 of the peripheral profile 40 of the base 38.

The process machine for the production of the capsule 31 comprises a shaper 51 made by a first sector 52 and a second sector 53, which reproduce as a whole a form conjugated to that of the peripheral profile 40 of the base 38 of the container.

Of the sectors 52, 53, the first sector 52 is destined to simultaneously engage with the central portion of the parabolic sides 49, 50, whereas the second sector 53 is destined to simultaneously engage with the peripheral portion of the parabolic sides 49, 50 and with the rectilinear sides 47, 48.

The sectors 52, 53 are actuatable independently in translation. The process machine provides also in this case a conveyor 54 having a series of pitch-separated seats 55, each destined to house a corresponding container 32 for the application of a corresponding filter 39.

The conveyor 54 can be pitch-actuated also in other ways, for example continuously, in order to align in sequence the containers 32 under the shaper 51 with the base 38 facing the shaper 51.

An applicator 56 is able to interpose the filter 39 between the base 38 of the container 32 and the shaper 51 before actuating this latter.

The applicator 56 comprises pliers 57 for unwinding a coiled band 58, from which the filter 39 is made, and a tool 60 for custom cutting the filter 39 from the coiled band 58.

The seats 55 are formed in order to house the containers 32 with a vertical axis 46 and with the base 38 facing upwards.

Also the sectors 52, 53 of the shaper 51 are oriented with a vertical axis in the direction of which they are movable.

In the embodiment of the capsule 31, the filter 39 advantageously has, before the application to the container 32, an initial high-encumbrance configuration, particularly stretched, and after the application to the container 32 has a reduced encumbrance configuration, in any case with the same useful filtering surface, obtained during the application phase to the container 32, in which the peripheral edge of the filter 39 is pressed against the peripheral profile 40 of the base 38 of the container 32 in order to deform itself until conforming with the same.

Advantageously, the modelling of the filter 39 from its high-encumbrance configuration to its reduced encumbrance configuration is directly realized in the process machine.

Figure 12A:
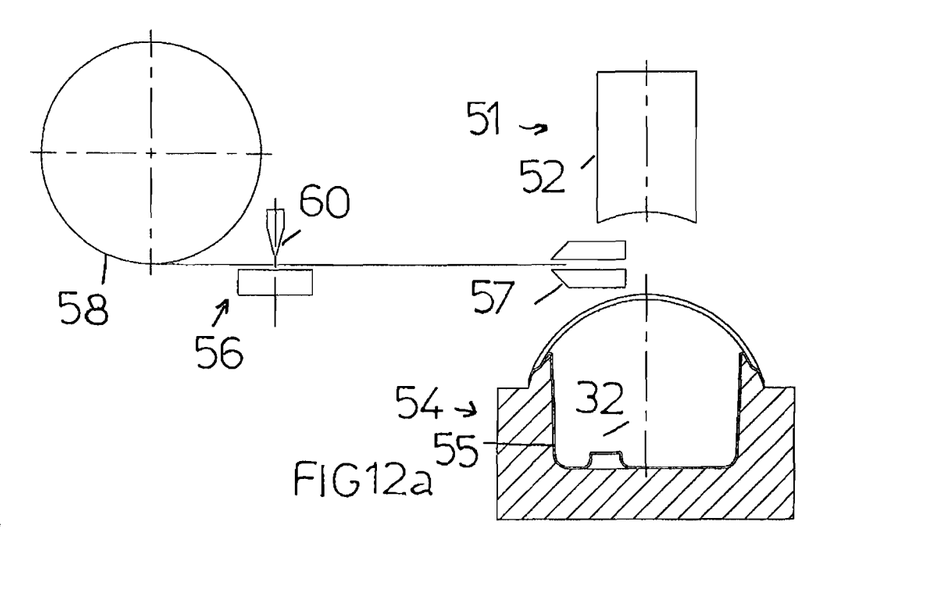
FIGS. 12a-12e show the timing sequence of the application phase of the filter to the container in the process machine for the production of the capsule in FIG. 7.
Figure 12B:
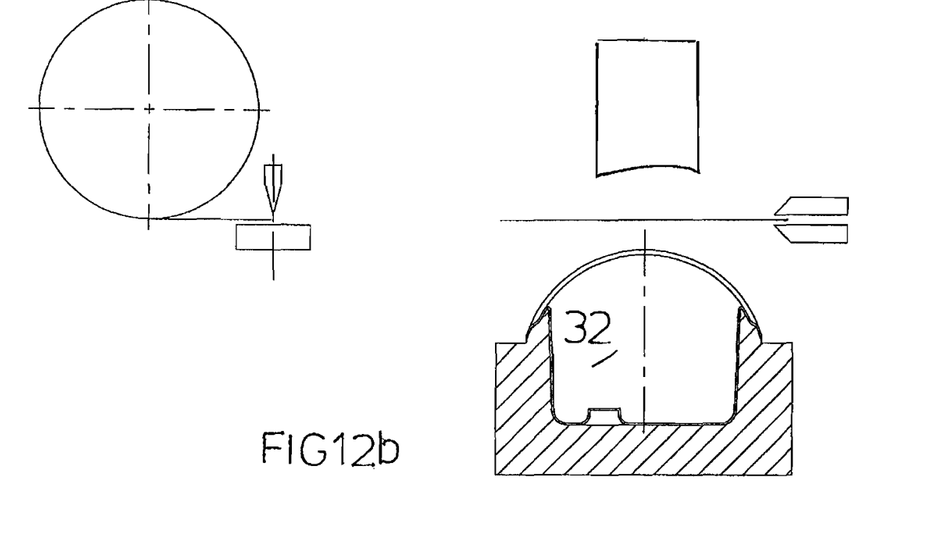

Initially, the pliers 57 pull the coiled band 58 by unwinding a portion which is positioned on the base 38 of the container 32, where the tool 60 cuts a rectangular strip forming the filter 39.

The filter 39, initially in a stretched configuration, rests on the base 38 of the container 32.

The first sector 52 and subsequently the second sector 53 are so actuated in a timing sequence against the peripheral profile 40 of the container 32.

The peripheral profile 40 of the base 38 substantially acts as an opposite die for the shaper 51.

Figure 12C:
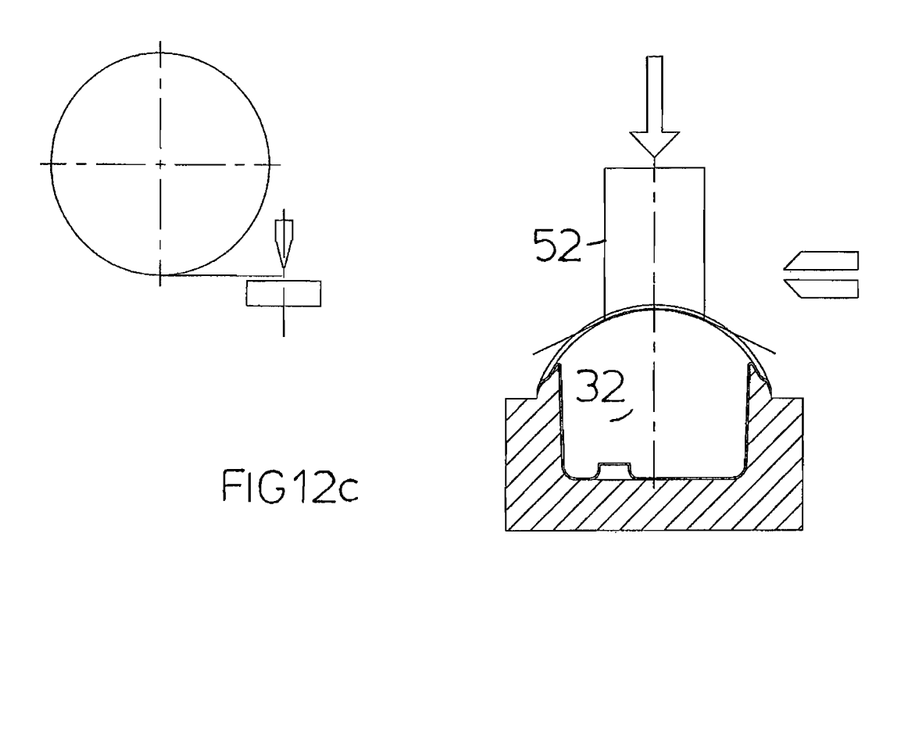

Particularly, the first sector 52, due to its vertical translation downwards, simultaneously contacts the central portion of the parabolic sides 49, 50 of the peripheral profile 40 of the base 38, by applying to the same the central portion of the filter 39.

Figure 12D:
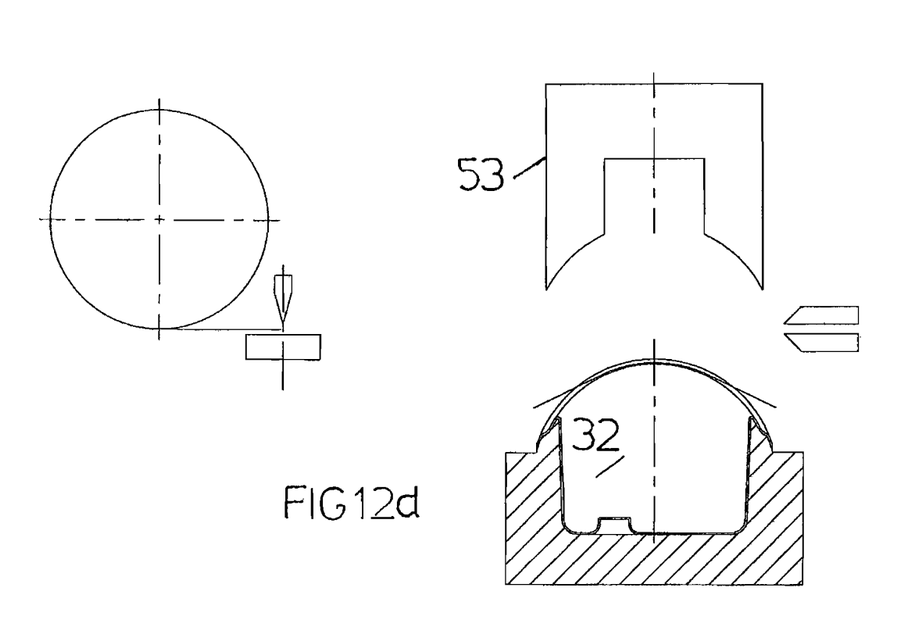
Figure 12E:
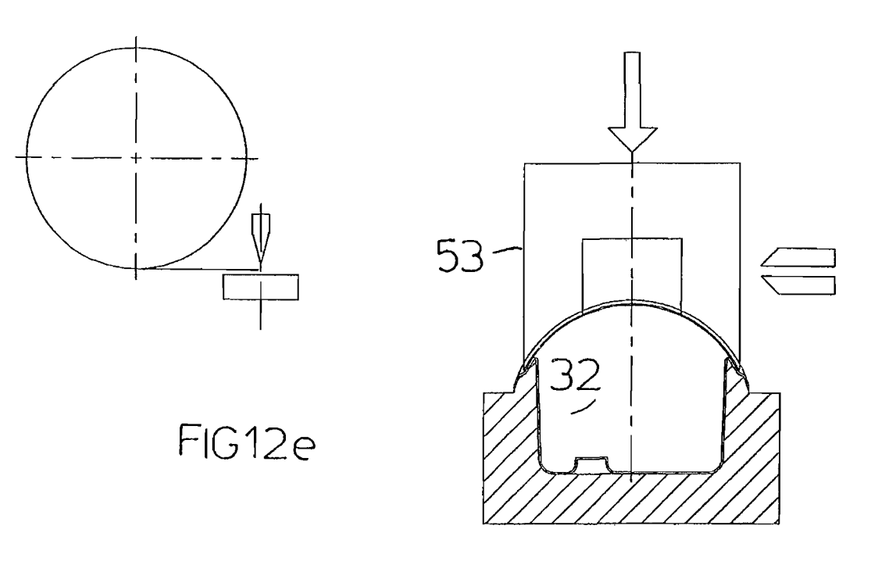

Subsequently, the second sector 53 due to its vertical translation downwards simultaneously contacts the peripheral portion of the parabolic sides 49, 50 of the peripheral profile 40 of the base 38, and with the rectilinear sides 47, 48 of the peripheral profile 40 of the base 38, by applying and conforming to them the remaining portion of the filter 39, and therefore by ending the application of the filter 39.

One of the main advantages of the invention resides in having created a compact capsule, wherein the surface of the filter is extremely elevated.

This fact facilitates the correct percolating process in the case where the capsule is destined to be used for the production of American coffee.

Obviously, such a capsule can be used at the same way for the production of an espresso coffee or any other type of beverage.

The disposable capsule so conceived is susceptible of various changes and variations, all within the scope of the inventive concept; furthermore, all the details can be substituted by technically equivalent elements.

In practice, the used materials and also their dimensions, can be of any kind according to the needs and to the state of the art.

What is claimed is:

1. A disposable capsule for production of an aromatic beverage, comprising:
   a container having a closed base, which can be perforated for the inlet of water, and an open base having a peripheral profile along at least one side thereof such that along the at least one side, the peripheral profile varies in height with respect to the closed base;
   a filter covering the open base for filtering a beverage overflowing from the container, the filter having a peripheral edge configuration conforming to a shape of the peripheral profile of the open base of the container, the configuration of the peripheral edge engaging the peripheral profile in a conforming manner, the configuration of the peripheral edge extending inward into the filter to cause the filter to have an increased filtering surface area through which water is filtered as compared to a plan area of an interior of the container encompassed by the open base;
   wherein said peripheral profile of said open base of the container has at least partially an undulatory development.

2. The capsule according to claim 1, wherein said peripheral profile of said open base of the container has at least partially a curvilinear development.

3. The capsule according to claim 1, wherein said open base is covered with a peelable protective film.

4. The capsule according to claim 1, wherein said closed base has one or more shapes permitting its identification.

5. The capsule according to claim 1, wherein said closed base has a number of perforation sites for the inlet of the water, variable in function of the feeding pressure requested for the water.

6. The capsule according to claim 5, wherein said perforation sites are flush with one or more shapes.

7. A disposable capsule for production of an aromatic beverage, comprising:
   a container having a closed base, which can be perforated for the inlet of water, and an open base having a peripheral profile along at least one side thereof such that along the at least one side, the peripheral profile varies in height with respect to the closed base;
   a filter covering the open base for filtering a beverage overflowing from the container, the filter having a peripheral edge configuration conforming to a shape of the peripheral profile of the open base of the container, the configuration of the peripheral edge engaging the peripheral profile in a conforming manner, the configuration of the peripheral edge extending inward into the filter to cause the filter to have an increased filtering surface area through which water is filtered as compared to a plan area of an interior of the container encompassed by the open base;
   wherein the peripheral profile has a corrugated configuration varying in height with respect to the closed base and the peripheral edge of the filter has a corrugated configuration conforming to a shape of the corrugated configuration of the peripheral profile of the open base, the corrugated configuration of the peripheral edge engaging the corrugated configuration of the peripheral profile in a conforming manner, the corrugated configuration of the peripheral edge extending inward into the filter to cause the filter to have the increased surface area through which water is filtered.

8. The capsule according to claim 7, wherein the container has four sides: a first side comprising the at least one side, a second side opposite the first side and having a same corrugated configuration peripheral profile as the first side, and opposing third and fourth sides extending between the first and second sides, the filter having the corrugated configuration extending from the first side to the second side.

9. The capsule according to claim 8, wherein the third and fourth sides are rectilinear in configuration.

10. The capsule according to claim 9, wherein the corrugated configuration of the peripheral profile of the first and second sides is sinusoidal.

11. The capsule according to claim 10, wherein the first and second sides are generally parallel to one another and the third and fourth sides are generally normal to the first and second sides to give the container a generally rectangular plan shape.

12. The capsule according to claim 7, wherein the corrugated configuration of the peripheral profile is sinusoidal.

13. A disposable capsule for production of an aromatic beverage, comprising:
   a container having a closed base, which can be perforated for the inlet of water, and an open base having a peripheral profile along at least one side thereof such that along the at least one side, the peripheral profile varies in height with respect to the closed base;
   a filter covering the open base for filtering a beverage overflowing from the container, the filter having a peripheral edge configuration conforming to a shape of the peripheral profile of the open base of the container, the configuration of the peripheral edge engaging the peripheral profile in a conforming manner, the configuration of the peripheral edge extending inward into the filter to cause the filter to have an increased filtering surface area through which water is filtered as compared to a plan area of an interior of the container encompassed by the open base;
   wherein the peripheral profile is sinusoidal.

* * * * *